UNITED STATES PATENT OFFICE.

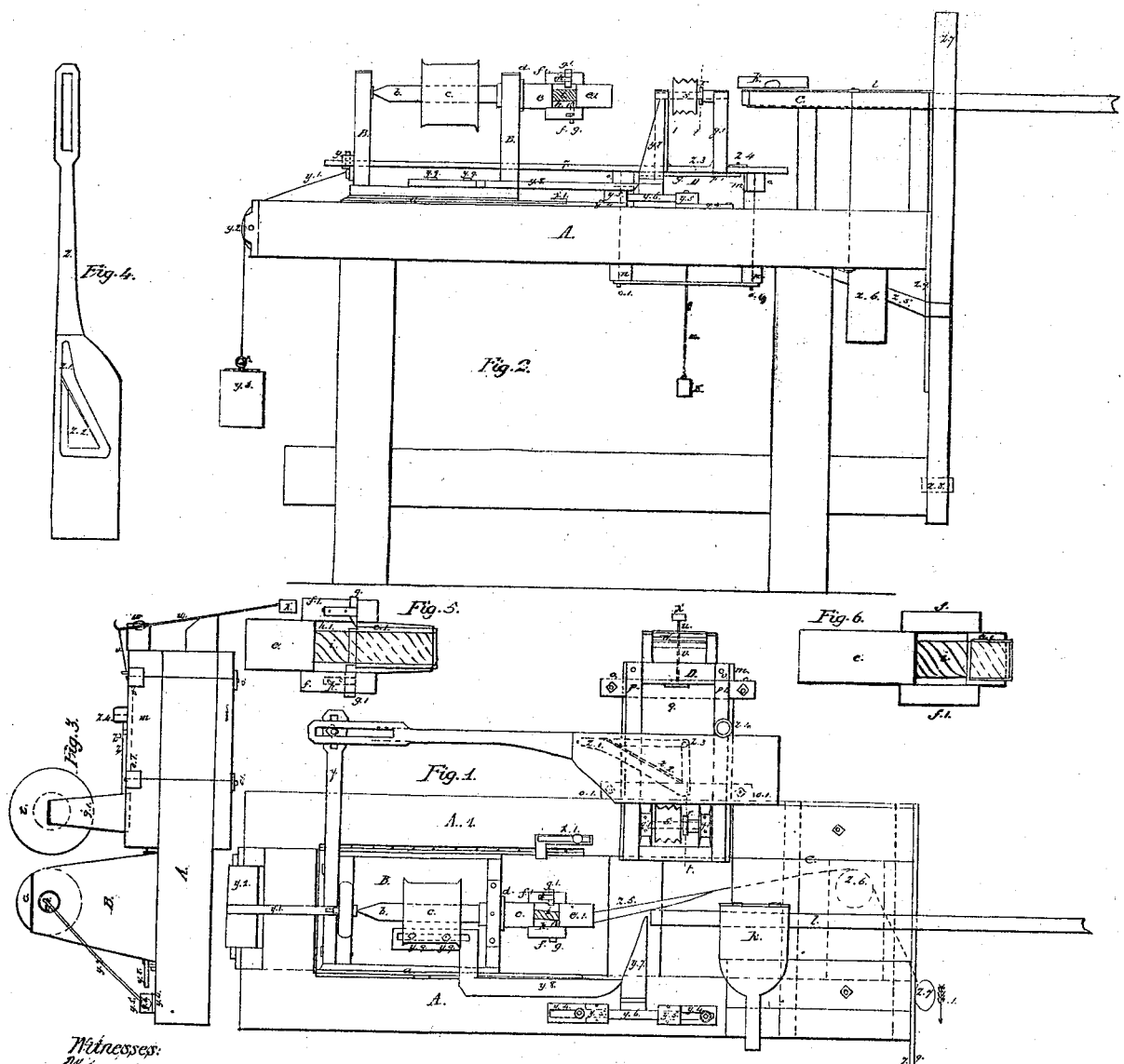

C. E. WARNER, OF NEW YORK, N. Y., ASSIGNOR TO JOHN H. STEVENS, OF SAME PLACE.

MACHINE FOR TURNING WOODEN BOXES.

Specification of Letters Patent No. 1,475, dated January 18, 1840.

*To all whom it may concern:*

Be it known that I, CHAUNCEY E. WARNER, of the city, county, and State of New York, machinist, have invented, made, and applied to use certain new and useful Improvements in the combination and arrangement of well-known mechanical means with parts invented or improved by me for the purpose of manufacturing wood boxes, commonly known as "druggists' boxes," and similar boxes for other purposes, for which improvements I seek Letters Patent of the United States, and that the said improvements, and the mode of constructing and using the same and the effects obtained thereby are fully set forth and shown in the following description and in the drawing attached to and making part of this specification, wherein—

Figure 1, is a plan of the machine. Fig. 2 is an elevation of the same, and Fig. 3 a cross section of the principal working parts, the auxiliary figures, for clearer explanation, are separately referred to, and the same letters and numbers, as marks of reference, apply to the same parts in all the several figures.

A, $A^1$ is the frame or bed carrying the working parts of the machine.

B, is the mandrel head or frame sliding on two side slideways $a$, $a$, screwed on the beds A and $A^1$; $b$ is the mandrel arbor, with the driving drum $c$, from which a belt is to communicate with any prime mover. $d$ is the mandrel nose on which is screwed a solid chuck $e$ connected by two wing flanches $f$ and $f^1$ to a hollow cylinder, $e^1$. These are cast or formed in one mass of metal and the opening between the wing flanches serves to clear the chips formed in working and on the face of the wing flanch $f$, is a chisel edged cutter $g$, at right angles to the wing face, and on the reverse face of the wing flanch $f^1$, is a chisel edged flat cutter $g^1$. These form the rebate on the top of the box and are held in place by screwed clamps $h$ and $h^1$. In front of the chuck $e$, a spiral bit or auger $i$ is screwed in long enough to go nearly or quite through the cylinder $e^1$ but of a less diameter than the interior of the cylinder, this chuck with the cylinder and bit are shown in half size nearly in the detached Fig. 5.

At the opposite end of the bed frame A, $A^1$, is a platform C with a semi-circular groove $l$, whose center is on the same line with the center of the chuck and cylinder $e$, $e^1$. Above this a broad clamp piece $k$ is jointed on by hinges, with a triangular groove, corresponding with the groove $l$ in the platform C. These serve to hold the rounded material which is to be formed into boxes and covers.

On the side of the bed frame $A^1$, is the saw platform D, made of a set of upper blocks $m$, upon the bed, on that side, and similar blocks $n$, below the bed. These are connected at the outer end, by a pair of cross clamps and screw bolts $o$, and at the part next the bed by a similar pair of cross clamps and screw bolts $o^1$. By slacking these the platform D can be shifted longitudinally on the bed $A^1$ and secured again at any required adjustment by tightening the screw bolts on the clamps $o^1$. On the platform are the slide ways $p$, $p^1$, between these is the slide $q$ with two small standards $q^1$, in these the arbor $r$ carries the driving drum $s$ and small circular saw $t$. At the back end of the slide $q$ is a joint bar $v$ whose other end is connected to a vertical lever $u$ whose fulcrum is in a roller $w$, through which it passes and at the lower end of the lever $u$ is the counterweight $x$.

At the back of the mandrel frame B a long cross lever $y$ is screwed on, extending back and finishing with a slotted end, through which a bolt and nut connects the bar $y$ to a longitudinal bar $z$ which at the other end is widened out, to allow of a triangular groove $z^1$ being formed in it, and on the hypothenuse of the groove a long spring $z^2$ extends to reach the outer face of the groove forming the base, this groove receives a pin $z^3$, on the saw slide $q$, the fore end of the bar is kept in place by the pin $z^3$ and a grooved guide roller $z^4$, on the carriage D prevents any lateral motion, these parts serve to bring the saw up into use, on the mandrel head B moving back, as hereafter described.

A strap or band $z^5$ is secured at one end in the front of the mandrel head B and passes around a vertical roller $z^6$ hung under this end of the main frame A the other end of the strap is attached to the vertical lever $z^7$ whose fulcrum is at $z^8$ on the lower piece of the main frame, and on this end of the upper piece of the main frame a quadrant guide piece $z^8$ prevents the lever passing under this end of the frame, when the lever is depressed by the workman, to draw the mandrel forward. From the back end of the mandrel B a strap $y^1$ passes over a roller $y^2$ and finishes with a counterweight $y^3$, which brings back the mandrel to the original position, when the lever $z^8$ is raised by the workman.

On the side A of the main frame a pair of slotted slides $y^4$ are screwed down having each a small carriage $y^5$ to receive the ends of a small arbor $y^6$, which carries the triangular gage stop $y^7$, whose use is to gage the length of the material to be worked on. Upon the foot of the mandrel frame B on the side A a counter slide $y^8$, is fitted with slots to receive bolts $y^9$, by which it may be adjusted to any position, the use of this is, that as the mandrel comes up for its work, the counterslide passing under the gage, throws it outward clear of the material which is to be operated on by the bit $i$. A small stop gage $x^1$ on the side $A^1$, regulates the extent of the motion of the mandrel head and the machine thus made is to be used as follows when adjusted to the required movements and sizes.

The workman places a long solid cylinder of any description of wood made accurately the size of the hollow cylinder $e^1$ into the groove $l$, with the inner end against the point of the gage stop $y^7$, and holding it by the clamp $k$, draws the lever $z^7$ in the direction of the arrow 1, the strap $z^5$ will draw the mandrel head B and chuck toward the wooden material which passing into the cylinder $e^1$, will be bored out by the bit $i$ until the motion of the mandrel head is stopped by the gage $x^1$, and the shoulder of the box will be cut by the cutters $g$ and $g^1$, on the wings $f$, $f^1$. The longitudinal bar $z$ having been adjusted by the bolts and slots on the bar $y$ will now have slidden in the same direction until the spring $z^2$ in the slot $z^1$ has passed the pin $z^3$, on $q$, the workman now returns the lever backward, by which the counterweight $y^3$ will begin to withdraw the bit $i$ at the same time that the hypothenuse of the groove $z^1$ will force the pin $z^3$ with the saw slide $q$ and saw $t$, toward the center of the machine, and the position having been adjusted accordingly, the saw will cut off the wood, so as to leave the proper thickness to form the bottom of the box.

On the mandrel head returning to its original position the bar $z$ will also return until the pin $z^3$ comes into the right angled part of the triangular groove $z^1$ and the weight $x$ on the vertical lever $u$ and joint piece $v$ will draw the saw slide $q$ and saw $t$ back into the standing position, out of the way of the next length of mandrel to be operated on. By repeating these operations any number of boxes may be successfully made.

By substituting the chuck shown in the detached Fig. 6 for that shown in the Fig. 5, and fitting a bit therein the same diameter as the shoulders of the boxes made, and adjusting the parts of the machine for the required length the covers or tops of the boxes can be made in the same manner in all other respects with the advantage that each cover or top will fit every box, and by using chucks and cylinders with bits of various diameters and lengths every required size or length of box may be readily made. The lever $z^7$ may be attached to a treadle and worked by the foot instead of by hand if found convenient to do so.

What I claim as new and of my own invention is—

1. The mode of connecting the chuck $e$ with the hollow cylinder $e^1$, by the wing flanges $f$, $f^1$, thereby giving a space for clearing chips in working and forming bearings for the cutters $g$, $g^1$, and the combination of these parts with the bit $i$ and sliding mandrel head B, when used for the purposes of boring out wooden boxes and rebating the tops for the covers and making the covers substantially as the same are herein described.

2. I claim the mode of forming and mounting the gage stop $y^7$ in combination with the counterslide $y^8$ by which the gage stop $y^7$ is detached from its contact with the material to be operated on and the material left clear for the operation of the bit $i$ and cutters $g$, $g^1$; when used in the formation of wood boxes and covers substantially as the said gage and counterslide are described.

3. I claim the mode of fitting the bar $z$ with the triangular groove $z^1$, and spring $z^2$ in the underside, and the operation of the same through the pin $z^3$, to advance the saw $t$ to cut off the material and allow the saw to return immediately by the operation of the weight $x$, and the combination of the said bar $z$ and groove $z^1$, and spring $z^3$, with the saw and parts connected therewith when used for forming wooden boxes, substantially as the same are herein described.

In witness whereof I have hereunto set my hand this twenty ninth day of October one thousand eight hundred and thirty nine in the presence of the witnesses subscribing hereto.

CHAUNCEY E. WARNER.

Witnesses:
W. TERRELL,
W. B. STOWELL.